United States Patent
Sridharan et al.

(10) Patent No.: US 12,206,292 B2
(45) Date of Patent: Jan. 21, 2025

(54) METHOD AND APPARATUS FOR COOLING A ROTOR ASSEMBLY

(71) Applicant: GE AVIATION SYSTEMS LLC, Grand Rapids, MI (US)

(72) Inventors: Balamurugan Sridharan, Bangalore (IN); Anirban Chatterjee, Bangalore (IN); Ami Hatim, Bangalore (IN)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 430 days.

(21) Appl. No.: 17/587,366

(22) Filed: Jan. 28, 2022

(65) Prior Publication Data

US 2023/0246499 A1 Aug. 3, 2023

(51) Int. Cl.
| | |
|---|---|
| H02K 1/32 | (2006.01) |
| H02K 1/24 | (2006.01) |
| H02K 1/26 | (2006.01) |
| H02K 3/24 | (2006.01) |
| H02K 9/19 | (2006.01) |
| H02K 19/16 | (2006.01) |

(52) U.S. Cl.
CPC ............. *H02K 1/32* (2013.01); *H02K 1/24* (2013.01); *H02K 3/24* (2013.01); *H02K 9/19* (2013.01); *H02K 19/16* (2013.01); *H02K 1/26* (2013.01)

(58) Field of Classification Search
CPC ............. H02K 1/32; H02K 1/24; H02K 3/24; H02K 9/19; H02K 19/16; H02K 1/26; H02K 3/51; H02K 5/203; H02K 9/193; H02K 9/20

USPC .................................................. 310/61, 54
See application file for complete search history.

(56) References Cited

U.S. PATENT DOCUMENTS

| | | | |
|---|---|---|---|
| 3,048,725 A | 8/1962 | Wesolowski | |
| 4,063,123 A * | 12/1977 | Herr .................... | H02K 3/12 |
| | | | 310/233 |
| 5,140,204 A | 8/1992 | Cashmore et al. | |
| 5,666,016 A | 9/1997 | Cooper | |
| 7,855,487 B2 | 12/2010 | Lemmers, Jr. et al. | |
| 7,902,702 B2 | 3/2011 | Hashiba | |
| 8,269,393 B2 | 9/2012 | Patel et al. | |
| 8,575,798 B2 | 11/2013 | Takahashi et al. | |
| 9,024,500 B2 | 5/2015 | Kimura et al. | |
| 9,614,407 B2 | 4/2017 | Nishikawa | |
| 10,333,365 B2 | 6/2019 | Patel et al. | |

(Continued)

FOREIGN PATENT DOCUMENTS

| | | |
|---|---|---|
| CN | 106787579 A | 5/2017 |
| EP | 0615333 B1 | 6/1997 |

(Continued)

*Primary Examiner* — Ahmed Elnakib
(74) *Attorney, Agent, or Firm* — McGarry Bair PC

(57) ABSTRACT

A method of cooling a set of rotor winding end turns of a rotor assembly can include directing a fluid coolant flow to a coil support assembly, delivering the fluid coolant flow, by a first coolant distribution ring of the coil support assembly, radially outward toward rotor winding end turns; and delivering the fluid coolant flow, by a coil support disc of the coil support assembly, axially outward toward the rotor winding end turns. The method can further include expelling fluid coolant flow by a second coolant distribution ring radially outward toward a set of stator windings, and expelling, by the coil support disc, the fluid coolant flow axially outward toward the rotor core.

18 Claims, 9 Drawing Sheets

(56) References Cited

U.S. PATENT DOCUMENTS

| | | |
|---|---|---|
| 10,554,088 B2 | 2/2020 | Huang et al. |
| 11,025,114 B2* | 6/2021 | Sridharan ................. H02K 3/51 |
| 2011/0133579 A1 | 6/2011 | Vandersyden |
| 2016/0211712 A1 | 7/2016 | Patel et al. |
| 2016/0211713 A1* | 7/2016 | Patel ........................ H02K 3/30 |
| 2018/0205294 A1* | 7/2018 | Manabe ................... H02K 9/19 |
| 2020/0212742 A1 | 7/2020 | Sridharan et al. |
| 2023/0179049 A1* | 6/2023 | Fulton ...................... H02K 1/32 310/52 |

FOREIGN PATENT DOCUMENTS

| | | |
|---|---|---|
| EP | 3046230 B1 | 9/2018 |
| EP | 2568574 B1 | 4/2019 |
| FR | 2984034 A1 | 6/2013 |
| FR | 3079978 A1 | 10/2019 |
| WO | 2009029743 A1 | 3/2009 |
| WO | 2020020551 A1 | 1/2020 |
| WO | 2020128888 A1 | 6/2020 |
| WO | 2020191167 A1 | 9/2020 |

\* cited by examiner

METHOD AND APPARATUS FOR COOLING A ROTOR ASSEMBLY

BACKGROUND

Electric machines, such as electric motors or electric generators, are used in energy conversion. Such electrical machines operate through the interaction of magnetic fields, and current carrying conductors generate the force or electricity respectively. Typically, an electrical motor converts electrical energy into mechanical energy. Conversely, an electrical generator converts mechanical energy into electrical energy. For example, in the aircraft industry, it is common to combine a motor mode and a generator mode in the same electric machine, where the electric machine in motor mode functions to start the engine, and, depending on the mode, also functions as a generator.

Regardless of the mode, an electric machine typically includes a rotor having rotor windings that are driven to rotate by a source of rotation, such as a mechanical or electrical machine, which for some aircraft may be a gas turbine engine. Heat is generated in the rotor due to the flow of current through the windings, and changing magnetic fields present in the rotor, causing the temperature to rise in the rotor. It is desirable to cool the rotor to protect the electrical machine from damage and to increase the electrical machine power density to allow for more power from a smaller physically sized electric motor.

BRIEF DESCRIPTION OF THE DRAWINGS

In the drawings:

FIG. 5A illustrates a cross sectional view, taken along line VA-VA of the first coolant distribution ring of FIG. 5, in accordance with various aspects described herein.

DETAILED DESCRIPTION

Figure 1:
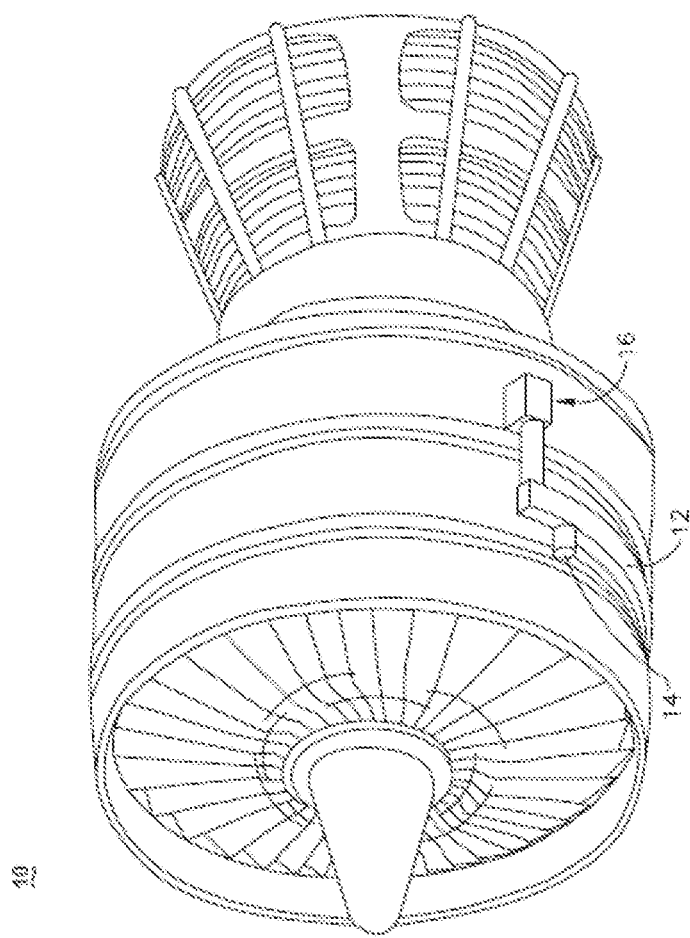
FIG. 1 is an isometric view of a gas turbine engine having a generator, in accordance with various aspects described herein.

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free liquid coolant (e.g. coolant freely moving within the cavity). In contrast, a "dry" cavity generator the rotor and stator can be cooled by coolant contained within limited in fluidly sealed passages (e.g. non-freely moving about the cavity).

The exemplary drawings are for purposes of illustration only and the dimensions, positions, order and relative sizes reflected in the drawings attached hereto can vary.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein.

While a generator 14 is shown and described, aspects of the disclosure are not so limited, and aspects can include any electrical machine, such as, without limitation, a motor, or generator.

Figure 2:
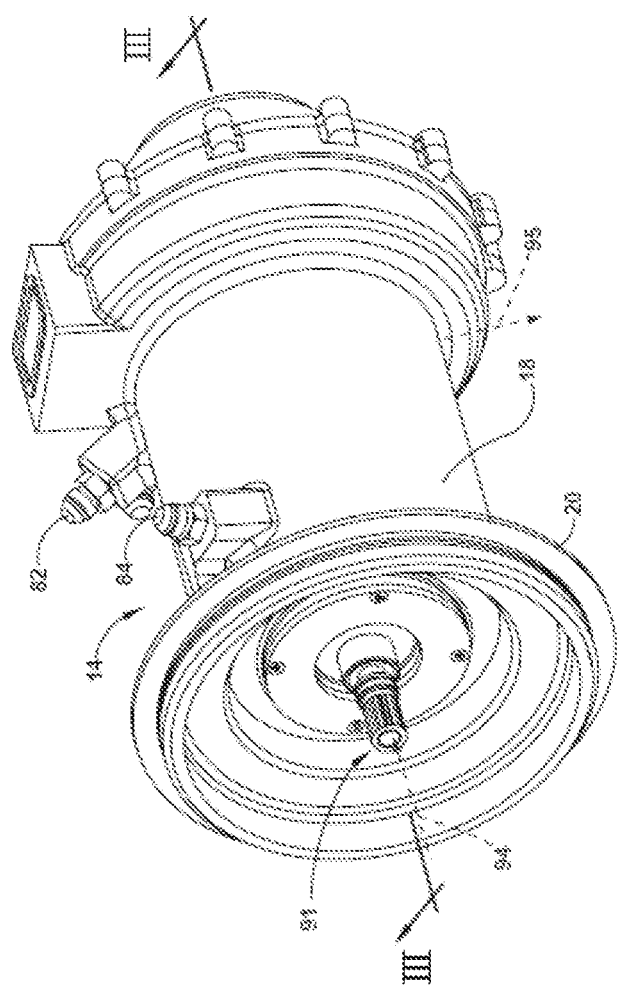
FIG. 2 is an isometric view of an exterior of the generator of FIG. 1, in accordance with various aspects described herein.

FIG. 2 more clearly illustrates a non-limiting example of the generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a rotor or stator of the generator 14. The liquid cooling system can also include a second coolant outlet port 91, shown at a rotatable shaft portion of the generator 14. Optionally, by way of non-limiting example, the liquid cooling system can include a rotatable shaft coolant inlet port 94 or a generator coolant outlet port 95. While not shown, aspects of the disclosure can further include other liquid cooling system components, such as a liquid coolant reservoir fluidly coupled with the cooling fluid inlet port 82, the rotatable shaft coolant inlet port 94, the cooling fluid outlet port 84, or the generator coolant outlet port 95, and a liquid coolant pump to forcibly supply the coolant through the ports 82, 84, 94, 95 or generator 14.

Figure 3:
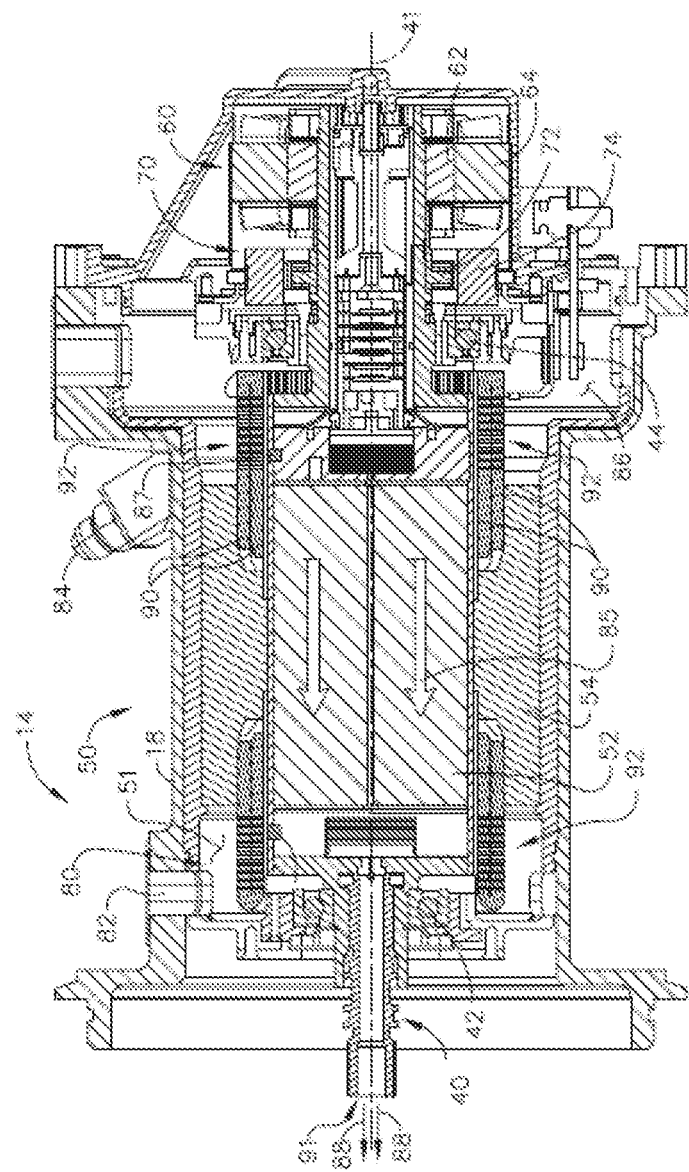
FIG. 3 is a schematic cross-sectional view of the generator of FIG. 2, taken along line of FIG. 2, in accordance with various aspects described herein.

A non-limiting interior of the generator 14 is best seen in FIG. 3, which is a cross-sectional view of the generator 14 shown in FIG. 2 taken along line A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on and co-rotate with the rotatable shaft 40. The fixed components can be mounted to any suitable part of the housing 18, and include the main machine stator 54, exciter stator 64, and PMG stator 74. Collectively, the fixed components define an interior through which the rotatable shaft 40 extends and rotates relative thereto.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can be oil cooled and thus can include a cooling system 80. The cooling oil can be used to dissipate heat generated by the electrical and mechanical functions of the generator 14. The cooling system 80 using oil can also provide for lubrication of the generator 14. In the illustrated aspects, the generator 14 can be a liquid cooled, wet cavity cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the main machine rotor 52, exciter rotor 62, and PMG rotor 72, as well as a rotor shaft cooling fluid outlet 88, such as the second coolant outlet port 91, wherein residual, unused, or unspent oil can be discharged from the rotatable shaft 40.

In non-limiting examples of the generator 14, the fluid coolant flow 85 can further be distributed, directed, exposed, sprayed, or otherwise deposited onto the set of stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

Figure 4:
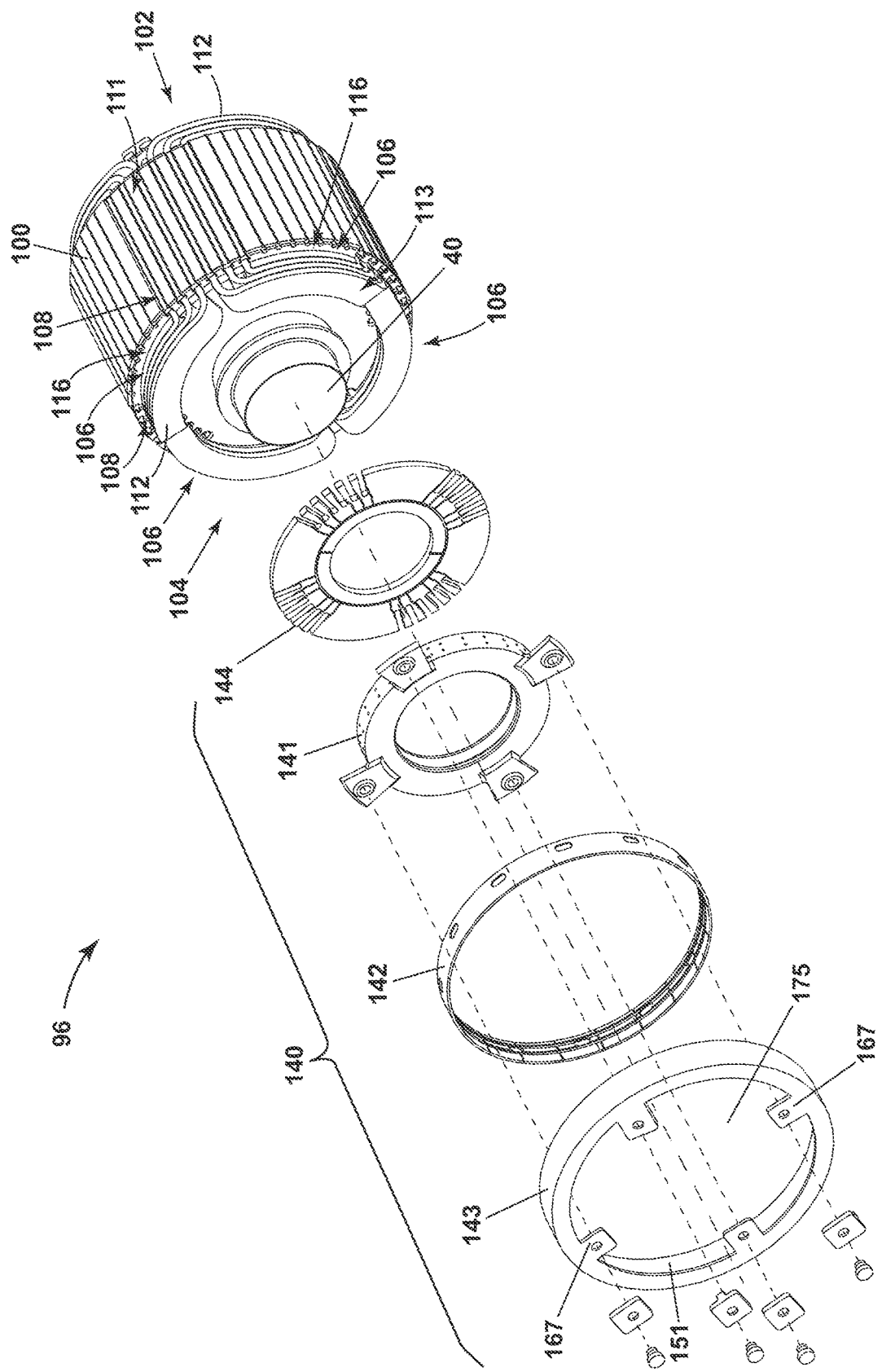
FIG. 4 illustrates a partially exploded isometric view of a rotor assembly and coil support assembly for the generator of FIG. 3, in accordance with various aspects described herein.

FIG. 4 illustrates an isometric partially exploded view of a main electrodynamic machine rotor assembly 96. As shown, the rotor assembly 96 can include a rotor core 100, such as a laminated rotor core, rotatably connected to co-rotate with the rotatable shaft 40. The rotor assembly 96 can include a set of coil support assemblies 140. Each coil support assembly 140 can include a respective first coolant distribution ring 141, a second coolant distribution ring 142, and a retaining bracket or ring 143. In some non-limiting aspects, each coil support assembly 140 can further include a coil support disc 144.

The rotor assembly 96 can further define a first end 102 and a second end 104, axially spaced from the first end 102. The rotor assembly 96 can include at least one rotor pole 106. In the illustration of FIG. 4, an aspect comprising four rotor poles 106 is shown. Other aspects are not so limited, and rotor assembly 96 can alternatively have fewer than four rotor poles 106, or more than four poles 106, without departing from the scope of the disclosure, and aspects can be adapted to rotor assemblies 96 having any desired number of rotor poles 106. Each rotor pole 106 can be defined by a set of conductive rotor wiring or rotor windings 110 wound about a portion of the rotor core 100. For example, in non-limiting aspects, the rotor core 96 can define a set of slots 108. The slots 108 can comprise a respective longitudinal axis extending axially along the rotor core 100. The slots 108 can be circumferentially spaced from each other. In non-limiting aspects, the slots 108 can be disposed about a periphery of the rotor core 100. The slots 108 can be sized to receive a respective rotor winding 110 therein. The rotor windings 110 disposed within the slots 108 can define an axial winding portion 111 extending axially along the rotor core 100, and rotor winding end turns 112 extending axially beyond the rotor core 100. In the perspective of the illustrated example, the slots 108 can underlie the set of rotor windings 110. While the rotor windings 110 or the rotor winding end turns 112 can refer to a set of or plural windings or end turns, an end turn can include only one of the set of rotor windings 110, or only one portion of the set of rotor windings 110 extending axially beyond the rotor core 100, such as only at the first end 102 or the second end 104.

The set of rotor winding end turns 112 can define respective loops or arcuate bight portions 113 disposed axially beyond the rotor core 100. In non-limiting aspects, each bight portion 113 can define a respective channel 116 extending therethrough. For example, in non-limiting aspects each respective channel 116 can have a width defined by a width and spacing between the slots 108.

In non-limiting aspects, the coil support assembly 140 can be disposed at either end 102, 104 of the rotor assembly 96. For example, in some aspects, a single coil support assembly 140 can be disposed at one end of the rotor assembly 96. In other non-limiting aspects, a respective coil support assembly 140 can be disposed at each end of the rotor assembly 96.

A respective coil support assembly 140 can be fixedly coupled to each end of the rotatable shaft 40 of the rotor assembly 96. For example, a respective coil support assembly 140 can be coupled to one end (e.g., the first end 102 or the second end 104) of the rotor assembly 96. In other aspects, a respective coil support assembly 140 can be coupled to the rotatable shaft 40 at both the first end 102 and the second end 104 of the rotor assembly 96.

Figure 5:
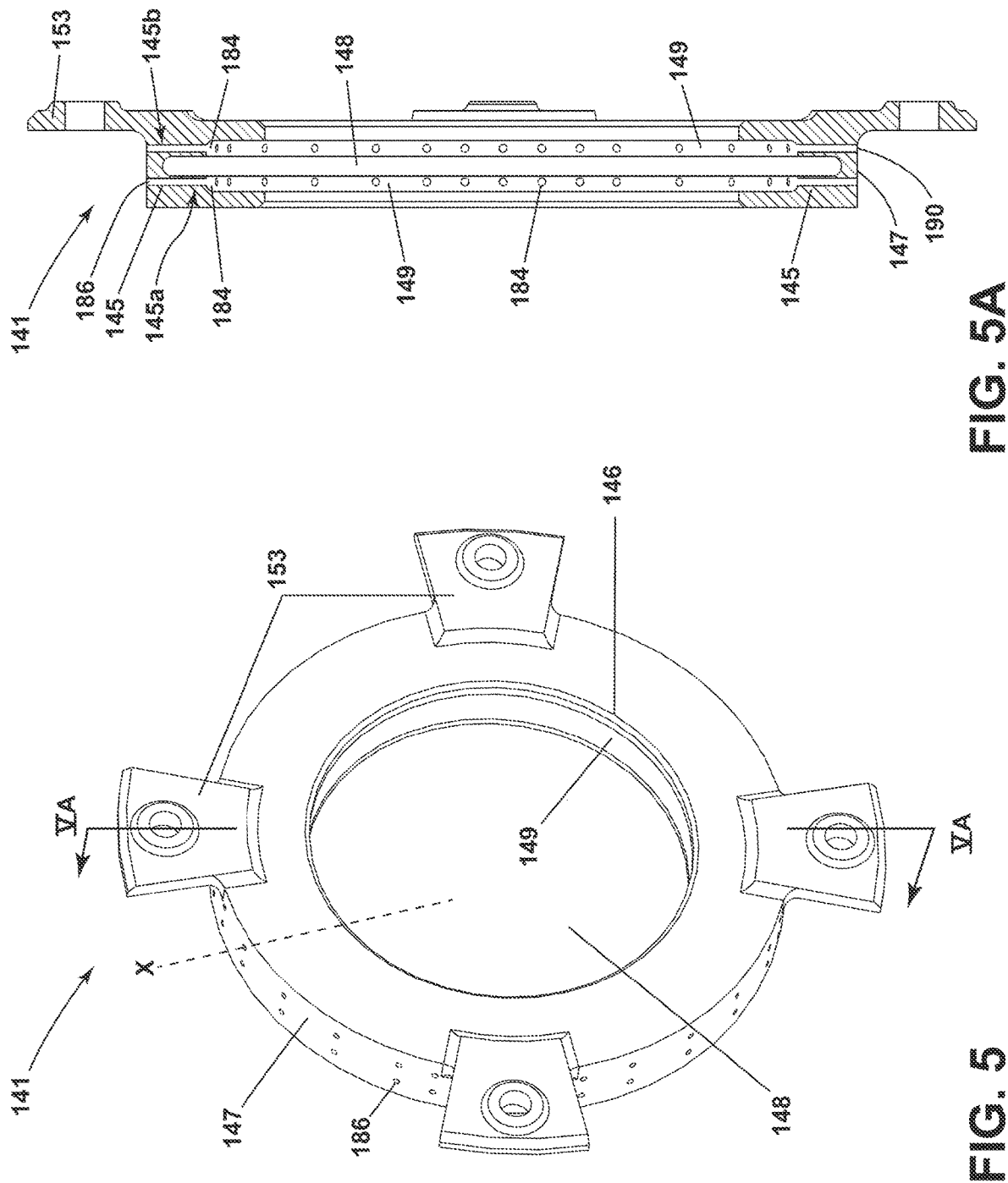
FIG. 5 illustrates a perspective view of the first coolant distribution ring of the rotor assembly of FIG. 4, in accordance with various aspects described herein.

A non-limiting aspect of the first coolant distribution ring 141 is depicted in FIG. 5 and FIG. 5A. In non-limiting aspects, the first coolant distribution ring 141 can comprise a generally annular member having an inwardly facing or first radially inner surface 146 and an opposing, outwardly facing or first radially outer surface 147. The first radially inner surface 146 can define a bore 148 sized to receive the rotatable shaft 40 therethrough and to receive a flow of coolant therefrom. As such, the first radially inner surface 146 can operatively define a coolant collection surface. In some aspects, the first radially inner surface 146 can be a relatively smooth surface. In other non-limiting aspects, the first radially inner surface 146 can define a set of channels or first grooves 149 thereon. The first grooves 149 can be arranged in fluid communication with the rotatable shaft 40. As such the set of first grooves 149 can cooperatively define a coolant reservoir.

The first coolant distribution ring 141 can further include a set of first channels 145 defined therethrough. In non-limiting aspects, the first channels 145 can be circumferentially spaced about the first coolant distribution ring 141. The first channels 145 can comprise respective longitudinal axes (designated "X") that extend radially through the first coolant distribution ring 141. The first channels 145 can be sized to allow a flow of cooling fluid therethrough. For example, each first channel 145 can extend radially from a first end 145a disposed at the first radially inner surface 146 to an opposing second end 145b at the first radially outer surface 147. Each first channel 145 can comprise a first coolant inlet 184 defined on the first radially inner surface 146, and a corresponding first coolant outlet 186 defined on the first radially outer surface 147, at the opposing second end 145b.

In operation, the first channels 145 can be in fluid communication with the rotatable shaft 40, or the set of first grooves 149, or both, to receive the flow of coolant therefrom. In non-limiting aspects, the first channels 145 can further be in fluid communication with a respective first coolant outlet 186. At least a subset of the coolant outlets 189 can define a respective spray nozzle 190 at a radially distal end. The spray nozzles 190 can be disposed at circumferentially spaced intervals on the first radially outer surface 147.

The first coolant distribution ring 141 can be fixedly coupled to the rotatable shaft 40 using one or more bolts, screws, pins, keys, or other known fasteners. In other non-limiting aspects, the first coolant distribution ring 141 can be coupled to the rotatable shaft 40 via an interference, friction, or press-fit engagement between the first coolant distribution ring 141 and the rotatable shaft 40. For example, the first radially inner surface 146 can be fixedly coupled to the rotatable shaft 40. Other aspects are not so limited, and it is contemplated that first coolant distribution ring 125 can be rotatably coupled to the rotatable shaft 40 by any desired affixing mechanisms. It will be appreciated that when so coupled, a rotation of the rotatable shaft 40 will result in rotation of the first coolant distribution ring 141.

In non-limiting aspects, the first coolant distribution ring 141 can further comprise a set of first tabs 153 extending radially therefrom. In some aspects, the first tabs 153 can be circumferentially spaced about the first coolant distribution ring 141. In some non-limiting aspects, the number of first tabs 153 can be equal to the number of poles of the generator 14. Other aspects are not so limited, and the first coolant distribution ring 141 can comprise any desired number of first tabs 153. For example, it will be appreciated that aspects as disclosed herein are not limited to any specific number of rotor poles, and aspects can be adapted to rotor assemblies 96 having any desired number of poles.

With reference back to FIG. 4, in non-limiting aspects, the first coolant distribution ring 141 can be disposed to at least partially underlie the rotor winding end turns 112. In this example, "underlie" denotes a relative position radially closer to the rotational axis 41 of the rotatable shaft 40. In non-limiting aspects, the first radially outer surface 147 can be arranged proximal to and facing the coil winding end turns 112.

With continued reference to FIG. 4, in non-limiting aspects, the retaining ring 143 can at least partially overlie the rotor winding end turns 112. In this example, "overlie"

denotes a relative position radially farther from the rotational axis 41 of the rotatable shaft 40.

In non-limiting aspects, the retaining ring 143 can be disposed to surround or enclose the first coolant distribution ring 141. For example, in non-limiting aspects, the retaining ring 143 can overlie or radially surround the first coolant distribution ring 141. In non-limiting aspects, the retaining ring 143 can optionally comprise a set of second tabs 167 extending radially therefrom. In some aspects, the second tabs 167 can be circumferentially spaced about the retaining ring 143. In non-limiting aspects, the number of second tabs 167 can be equal to the number of poles of the generator 14. Other aspects are not so limited, and the retaining ring 143 can comprise any desired number of second tabs 167.

The retaining ring 143 can be rigidly or fixedly coupled to the first coolant distribution ring 141. For example, the retaining ring 143 can be coupled to the first coolant distribution ring 141 using bolts or other fasteners disposed through the set of second tabs 167. In other non-limiting aspects, the retaining ring 143 can be coupled to the first coolant distribution ring 141 using bolts or other fasteners disposed through the set of first tabs 153. In still other non-limiting aspects the retaining ring 143 can be coupled to the first coolant distribution ring 141 using bolts or other fasteners disposed through both the set of first tabs 153 and the set of second tabs 167. When so coupled, the retaining ring 143 can limit or arrest an axial movement of the first coolant distribution ring 141. In aspects the retaining ring 143 and first coolant distribution ring 141 can cooperatively limit a radial deflection or relative movement of the rotor winding end turns 112.

In non-limiting aspects, the retaining ring 143 can be further arranged to surround the second coolant distribution ring 142. For example, the retaining ring 143 can be arranged be to at least partially overlie the second coolant distribution ring 142. In this example, "overlie" denotes a relative position radially farther from the rotational axis 41 of the rotatable shaft 40. In non-limiting aspects, the retaining ring 143 can comprise a radially inner surface 151 defining a central bore 175. The radially inner surface 151 can be disposed to face the radially outer surface 157 of the second coolant distribution ring 142.

Figure 6:
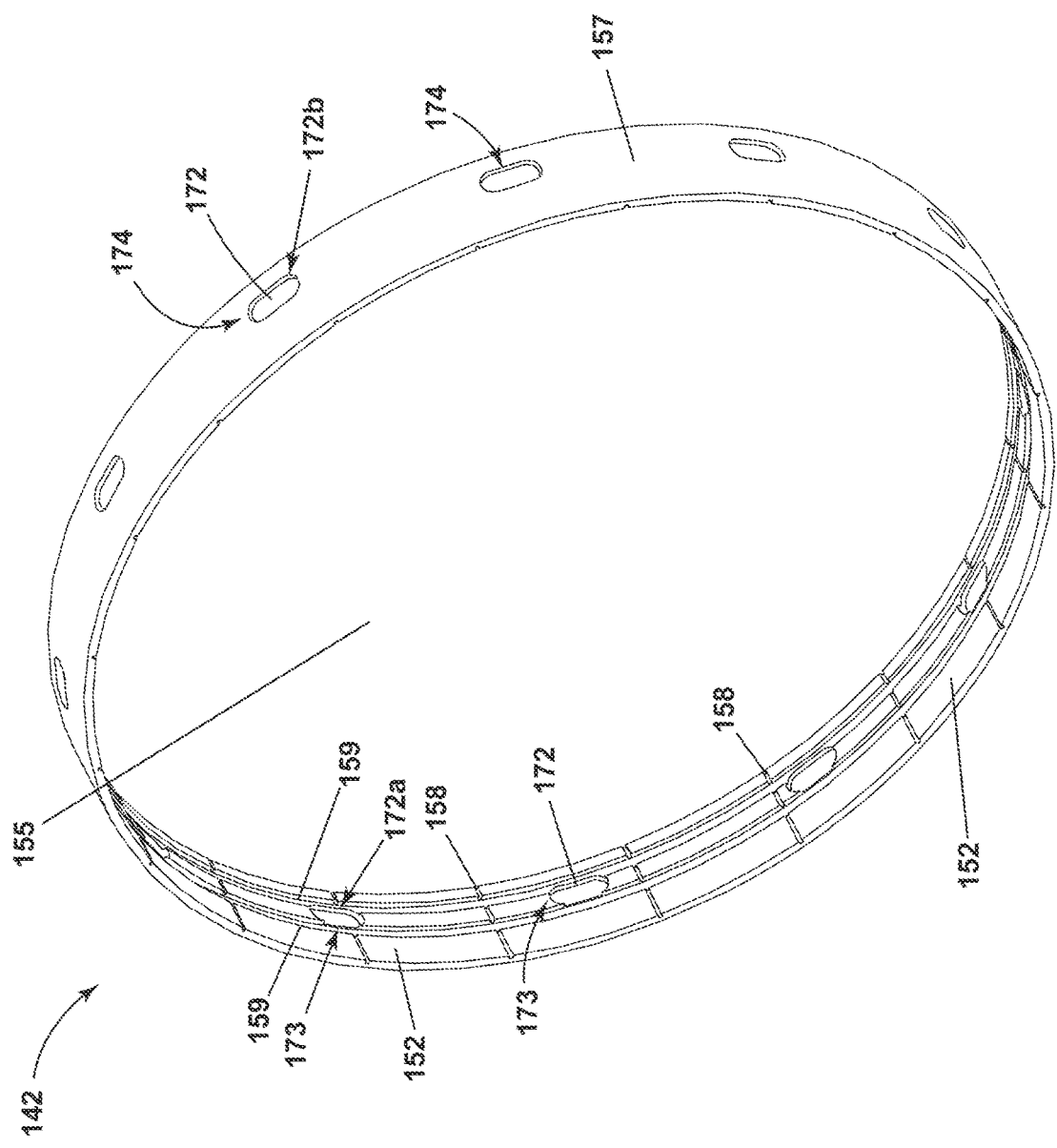
FIG. 6 illustrates a perspective view of the second coolant distribution ring of the rotor assembly of FIG. 4, in accordance with various aspects described herein.

A non-limiting aspect of the second coolant distribution ring 142 is depicted in FIG. 6. The second coolant distribution ring 142 can include an inwardly facing second radially inner surface 152 defining a central bore 155. The second coolant distribution ring 142 can further include outwardly facing, second radially outer surface 157 opposing the second radially inner surface 152. The second radially inner surface 152 can define a set of second grooves 158 and a set of third grooves 159. In nonlimiting aspects, the second grooves 158 can comprise an axially extending longitudinal axis. In aspects, the second grooves 158 can be circumferentially spaced from each other. The third grooves 159 can comprise a circumferentially extending longitudinal axis. The third grooves 159 can be axially spaced from each other. In non-limiting aspects, the second grooves 158 and third grooves 159 can be arranged at an angle with respect to each other. For example, as illustrated, in some aspects the second grooves 158 can be arranged orthogonally with respect to the third grooves 159. In other aspects the second grooves 158 can be arranged at any desired angle (i.e., non-parallel) with respect to the third grooves 159. In operation, the second grooves 158 and third grooves 159 of the second coolant distribution ring 142 can be arranged in fluid communication with the set of first grooves 149 of the first coolant distribution ring 141 to receive the fluid coolant flow 85 therefrom.

The second coolant distribution ring 142 can further define a set of second channels 172 extending therethrough. In non-limiting aspects, the second channels 172 can extend radially between the second radially inner surface 152 and the second radially outer surface 157. In some aspects, the second channels 172 can be circumferentially spaced from each other about the second coolant distribution ring 142. The second channels 172 can be in fluid communication with at least one of the set of second grooves 158 and the set of third grooves 159 to receive a flow of coolant therefrom. The second channels 172 can comprise a respective longitudinal axis that extends radially through the second coolant distribution ring 142. The second channels 172 can be sized to allow the fluid coolant flow 85 to flow therethrough. For example, each radially extending second channel 172 can extend radially from a first end 172a disposed at the second radially inner surface 152 to an opposing second end 172b disposed at the second radially outer surface 157. Each second channel 172 can comprise a second coolant inlet 173 defined on the first radially inner surface 146 in fluid communication with at least one of the set of second grooves 158 and the set of third grooves 159. Each second channel 172 can further comprise a corresponding second coolant outlet 174 defined on the second radially outer surface 157, at the opposing second end 172b.

With reference to FIG. 4, in non-limiting aspects, the second coolant distribution ring 142 can be disposed to at least partially overlie the rotor end turns 112 relative to the rotational axis 41 of the rotatable shaft 40. The second coolant distribution ring 142 can be in fluid communication with the rotor winding end turns 112. In non-limiting aspects, the second coolant distribution ring 142 can be disposed radially between the end turn windings 112 and the retaining ring 143. In non-limiting aspects, the second coolant distribution ring 142 can be disposed to underlie the retaining ring 143.

Figure 7:
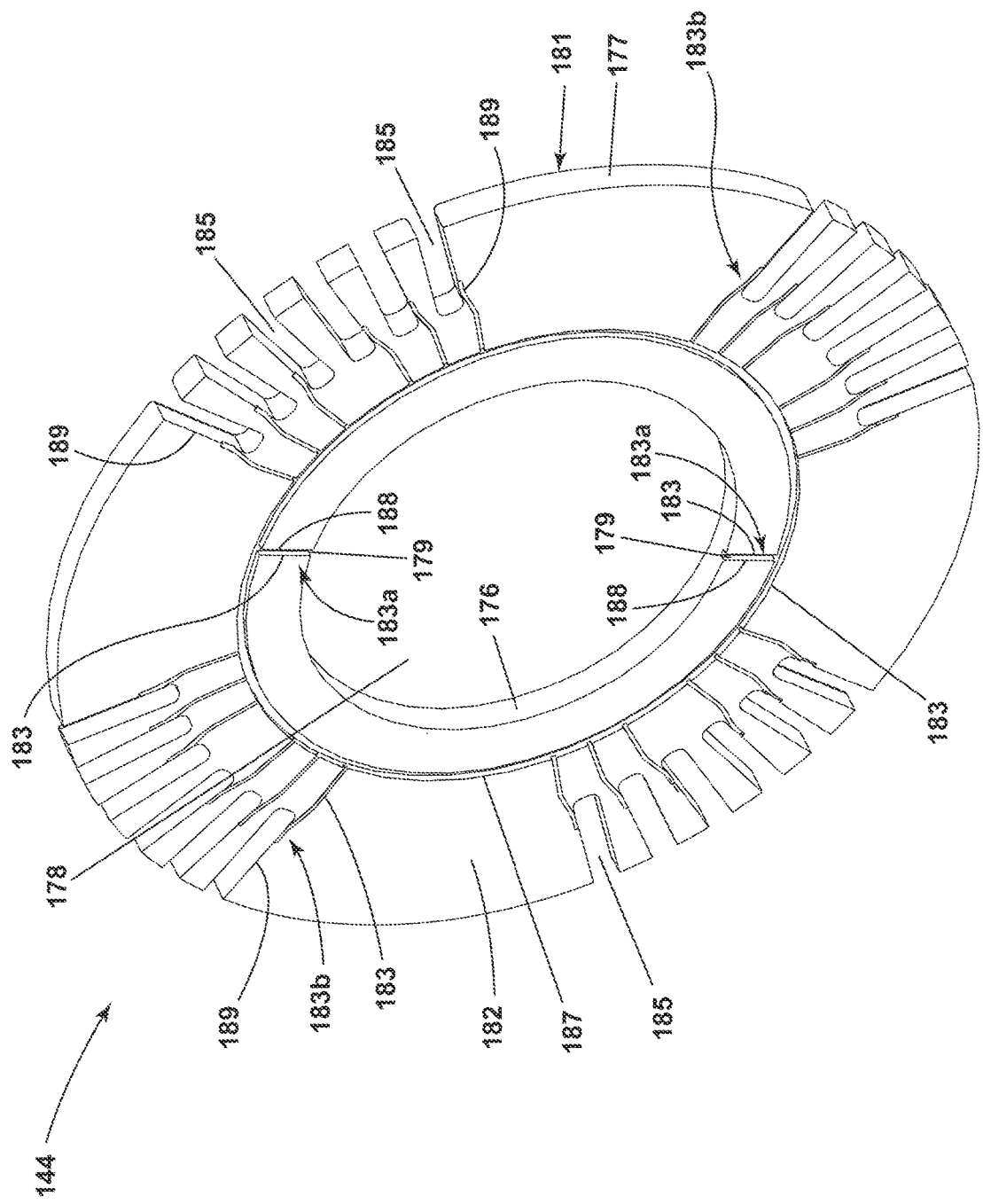
FIG. 7 illustrates a perspective view of the coil support disc of the rotor assembly of FIG. 4, in accordance with various aspects described herein.

FIG. 7 depicts a non-limiting aspect of the coil support disc 144. In non-limiting aspects, the coil support disc 144 can comprise an annular member or disc having a first face 181 and an opposing second face 182. For example, the first face 181 can be axially inwardly facing, e.g. disposed to face the rotor core 100. In aspects, the second face 182 can be axially outwardly facing, e.g., disposed to face away from the rotor core 100. The coil support disc 144 can comprise a radially inwardly facing, or third radially inner surface 176 (i.e., facing the rotatable shaft 40) and an opposing radially outwardly facing, or third radially outer surface 177 (i.e., facing outward from the rotatable shaft 40). The third radially inner surface 176 and third radially outer surface 177 can be arranged between the first face 181 and second face 182.

In non-limiting aspects, the third radially outer surface 177 can define a set of notches 185 or gaps defined therethrough. The notches 185 can be circumferentially spaced from each other about the coil support disc 144. The notches 185 can be sized to operatively receive a respective rotor winding 110 axially therein. In this way, the coil support disc 144 can support, or otherwise limit a lateral movement of each rotor winding 110 disposed within a respective notch 185.

The third radially inner surface 176 can define a bore 178 sized to receive the rotatable shaft 40 therethrough. In non-limiting aspects, the third radially inner surface 176 can be arranged in fluid communication with the rotatable shaft 40 to receive a fluid coolant flow 85 therefrom. As such, the third radially inner surface 176 can operatively provide a coolant collection surface. In some aspects, the third radially inner surface 176 can be a relatively smooth surface. In other non-limiting aspects, the third radially inner surface 176 can define a set of fourth grooves 179 or notches thereon. The third radially inner surface 176 or the fourth grooves 179 or both, can be in fluid communication with the rotatable shaft 40. As such, third radially inner surface 176 or the fourth grooves 179 or both, can operatively provide a coolant reservoir.

The coil support disc 144 can further include a set of third channels 183 defined therethrough. In non-limiting aspects, at least a portion of the third channels 183 can be circumferentially spaced from each other about the coil support disc 144. Each third channel 183 can define a respective path extending radially through the coil support disc 144. In some non-limiting aspects, a fourth channel 187 can be defined in fluid communication with at least a subset of the third channels 183. In this sense, at least a subset of the third channels 183 can be in fluid communication with each other via the fourth channel 187. For example, the fourth channel 187 can be arranged to extend circumferentially about the coil support disc 144 and coupled to at least a subset of the third channels 183. The third channels 183 and fourth channel 187 can be sized to allow a flow of cooling fluid therethrough. At least a subset of the third channels 183 can extend or traverse from a first end 183a at the third radially inner surface 176 to an opposing second end 183b. In non-limiting aspects the second end 183b can be disposed at the third radially outer surface 177. For example, the second end 183b can be disposed within a respective notch 185. In this sense, the third radially inner surface 176 can be in fluid communication with the set of notches 185 via the set of third channels 183. It will be appreciated that because the third radially inner surface 176 and set of third channels 183 can be in fluid communication with the set of notches 185, the third radially inner surface 176 and set of third channels 183 can further be in fluid communication with the respective winding 110 disposed in the respective notch 185. In other non-limiting aspects, the second end 183b can be disposed on the first face 181. Each third channel 183 can comprise a third coolant inlet 188. In non-limiting aspects, the third coolant inlet 188 can be defined on the first radially inner surface 146. In some aspects, each third channel 183 can further comprise a third coolant outlet 189 at the opposing second end 183b. In non-limiting aspects, the third coolant outlet 189 can be defined on the first face 181. In other aspects, the third coolant outlet 189 can be defined on the third radially outer surface 177. For example, in non-limiting aspects the third coolant outlet 189 can be defined within a respective notch 185. In some aspects, the third coolant outlets 189 can be disposed at circumferentially spaced intervals on the first face 181. In aspects, the second channels 172 can be in fluid communication with the rotatable shaft 40, or the set of first grooves 149, or both, to receive the fluid coolant flow 85 therefrom. In this way, the fluid coolant flow 85 can be operatively centrifugally conveyed from the third radially inner surface 176 to the set of third channels 183 and to the set of notches 185. In non-limiting aspects, the fluid coolant flow 85 through the set of third channels can be in parallel with the fluid coolant flow 85 through the first coolant distribution ring 141, or the second coolant distribution ring 142, or both.

The coil support disc 144 can be fixed to the rotatable shaft 40 using one or more bolts, screws, pins, keys, or other known fasteners. In other non-limiting aspects, the coil support disc 144 can be coupled to the rotatable shaft 40 via an interference, friction, or press-fit engagement between the coil support disc 144 and the rotatable shaft 40. Other aspects are not so limited, and it is contemplated that the coil support disc 144 can be rotatably coupled to the rotatable shaft 40 by any desired affixing mechanisms. It will be appreciated that when so coupled, a rotation of the rotatable shaft 40 will result in rotation of the first coolant distribution ring 141.

In non-limiting aspects, the coil support disc 144 can be operatively disposed between the rotor core 100 and the first coolant distribution ring 141. For example, in non-limiting aspects, the coil support disc 144 can be disposed within one or more of the channels 116 defined by the rotor winding end turns 112.

It will be appreciated that aspects as disclosed herein are not limited to any specific number of rotor poles, and aspects can be adapted to rotor assemblies 96 having any desired number of poles.

Figure 8:
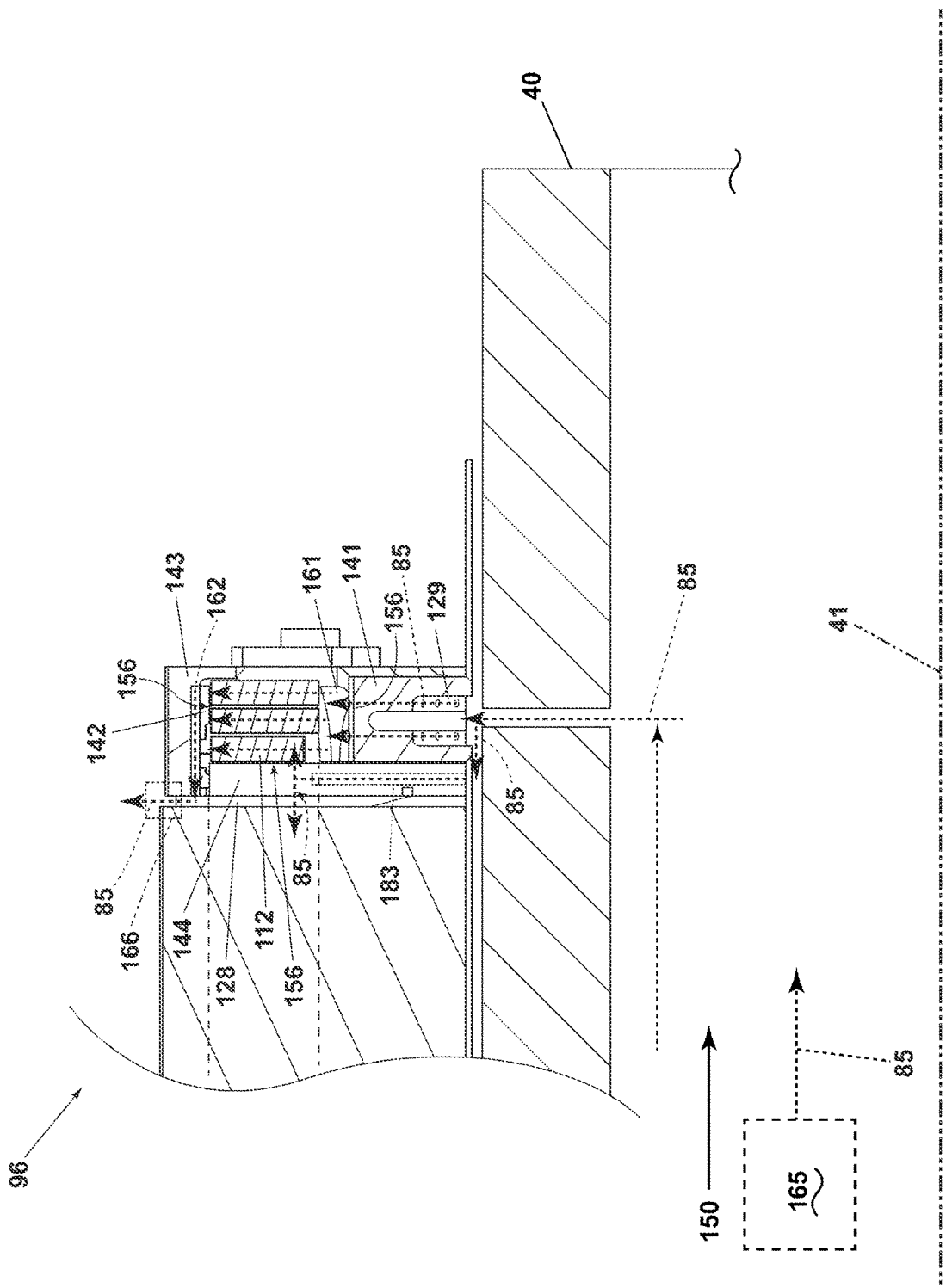
FIG. 8 illustrates a zoomed cross-sectional view of the coil support assembly of the rotor assembly of FIG. 4, in accordance with various aspects described herein.

FIG. 8 illustrates a portion of the rotor assembly 96 of FIG. 4 for better understanding the cooling system 80 and fluid coolant flow 85 from the rotatable shaft 40 to the set of rotor winding end turns 112 and the set of stator winding end turns 92. As will be described in more detail herein, the fluid coolant flow 85 can be channeled or conveyed to the coolant winding end turns 112 via the first coolant distribution ring 141, or the end coil support disc 144, or both.

The rotatable shaft 40 defines a first coolant conduit 150 fluidly connected with a source of coolant 165. The source of coolant 165 can be, but is not limited to the cooling fluid inlet port (not shown). The direction or location of the source of coolant 165 is not limited by the illustration and can be considered in any location that is fluidly coupled to the first coolant conduit 150. It is further considered that additional conduit, pumps, valves, or other devices can be included to fluidly connect the source of coolant 165 and the first coolant conduit 150.

Fluid can enter the rotatable shaft 40 of the rotor assembly 96 via the inlet port 82. The rotatable shaft 40 at least in part, can define the first coolant conduit 150, through which fluid can flow radially outward from the rotational axis 41 due to the centrifugal force effects of the rotatable shaft 40. A first radial coolant passage 154, by way of extending radially through the rotatable shaft 40, can fluidly couple the first coolant conduit 150 and the first coolant distribution ring 141.

The first coolant distribution ring 141 can receive the coolant fluid from the first radial coolant passage 154 via the first radially inner surface 146. For example, the coolant fluid can collect or accumulate in the set of first grooves 149 defined on the first radially inner surface 146, and then be centrifugally conveyed to the first channels 145, and to a respective first coolant outlet 189. The first coolant outlets 189 can comprise a respective spray nozzle 190 at a radially distal end. The spray nozzles 190 can be directed to provide a flow of coolant fluid radially outwardly therefrom.

In some non-limiting aspects, a first cavity 161 can be cooperatively defined by the rotatable shaft 40, or the first coolant distribution ring 141, or both, and the rotor winding end turns 112. The first cavity 161 can underlie at least a portion of the rotor winding end turns 112. For example, in non-limiting aspects, each first cavity 161 can be defined between the rotor coil end turns 112 and the first radially outer surface 147. In aspects, each first cavity 161 can be disposed relative to and underlying one of the sets of rotor winding end turns 112

In some non-limiting aspects, a second cavity 162 can be cooperatively defined by the second radially outer surface 157 of the second coolant distribution ring 142, and the retaining ring 143. In some aspects, the second cavity 162 can be coupled in fluid communication with the second channels 172 of the second coolant distribution ring 142 to operatively receive the fluid coolant flow 85 therefrom.

In non-limiting aspects, a gap or coolant outlet 163 can cooperatively be defined by the coil support assembly 140 and the rotor core 100. In non-limiting aspects, the coolant outlet 163 can be in fluid communication with the set of second channels 172 of the second coolant distribution ring 142. The coolant outlet 163 can be disposed at an outer circumference 164 of the rotor assembly 96. Optionally, the coolant outlet 163 can be a nozzle 166 configured to direct coolant toward the set of stator windings 90 or the set of stator winding end turns 92. The coolant outlet 163 or the nozzle 166 can be at least partially defined by, in contact with, or coupled to an insulating layer 128 located axially between at least part of the rotor core 100 and the coil support disc 144.

As shown, the rotor winding end turns 112 can include a set of radial rotor end turn passages 156. As used herein, the set of radial rotor end turn passages 156 refers to a set of radially extending passages between the rotor windings 110 that can fluidly couple the first cavity 161 to the second coolant distribution ring 142 or the second cavity 162 or both. For example, in non-limiting aspects, the rotor end turn passages 156 can include the respective channel 116 extending through a bight portion 113 defined by a respective rotor winding end turn 112

In one non-limiting example, the first cavity 161 can be configured to overlie the coolant fluid output volume from the first radial coolant passage 154, the set of nozzles 190, or both, such that fluid expelled from the first radial coolant passage 154 or set of nozzles 190 is received by the first cavity 161. The first cavity 161, can be configured to limit or restrict where fluid received from the first radial coolant passage 154 or set of nozzles 190 traverses radially, axially, or a combination thereof, such that the fluid is reliably delivered radially from the first cavity 161 to the rotor winding end turns 112 or the radial rotor end turn passages 156, and then to the second coolant distribution ring 142 via the second cavity 162.

The set of second grooves 158 and the set of third grooves 159 of the second coolant distribution ring 142 can be in fluid communication with the radial rotor end turn passages 156 to receive the coolant fluid flow 85 therefrom. In operation, the coolant fluid can be centrifugally conveyed from the second grooves 158 and third grooves 159 to the set of second channels 172 and to the respective second coolant outlet 174. The coolant fluid can then be conveyed toward the coolant outlet 163, via the second cavity 162, such as in an axially inward direction (e.g., toward the rotor core 100), to the coolant outlet 163.

The coolant outlet 163 can receive the fluid coolant flow 85 from one or more second channels 172 via the second cavity 162. For example, in non-limiting aspects, the second cavity 162 can be in fluid communication with the coolant outlet 163 via the radially inner surface 151 such that the rotation of the rotatable shaft 40 about the rotational axis 41 radially expels the fluid coolant flow 85 past the rotor winding end turns 112 and radially outward from the rotor assembly 96.

Additionally, in non-limiting aspects, the coil support disc 144 can receive the coolant fluid from the first radial coolant passage 154 via the third radially inner surface 176. For example, the coolant fluid can collect or accumulate in the one or more fourth grooves 179. In operation, the coolant fluid can be centrifugally conveyed from the one or more fourth grooves 179 to the set of third channels 183 and to the respective coolant outlet 189. In non-limiting aspects, at least a subset of the coolant outlets 189 can be in fluid communication with a respective notch 185 and the coil winding end turn 112 disposed therein. In some non-limiting aspects, at least a subset of the coolant outlets 189 can be in fluid communication with a respective slot 108 defined in the rotor core 100.

During operation of the generator 14, the rotation of the magnetic field generated by the set of main machine rotor windings 110 relative to the set of main machine stator windings 90 generates electricity in the main machine stator windings 90. This magnetic interaction further generates heat in the set of main machine rotor windings 110 and main machine stator windings 90. In accordance with aspects described herein, coolant fluid can enter the rotatable shaft 40 of the rotor assembly 96 via the inlet port 82. The rotatable shaft 40 at least in part, can define the first coolant conduit 150, through which fluid can flow radially outward from the rotational axis 41. Fluid from the first coolant conduit 150 can pass through the first radial coolant passage 154 to be radially received by the coil support disc 144 to be radially received at the notches 185 defined thereon and in contact with the rotor windings 110 disposed in the notches 185. This contacting can remove heat from the rotor windings 110 into the coolant. The coolant can then be expelled axially into passages defined in the rotor core 100. Additionally, or alternatively, fluid from the first coolant conduit 150 can pass through the first radial coolant passage 154 to be radially received by the first coolant distribution ring 141 and distributed to the first cavity 161. Fluid can continue to flow radially outward through the first cavity 161 and through the radial rotor end turn passages 156 that pass between the rotor windings 110 to thereby transfer heat from the set of main machine rotor windings 110 into the coolant by conduction. The coolant can be radially expelled from radial rotor end turn passages 156 into the second cavity 162, where it further can collect at the radially inner surface 151. The radially inner surface 151 can redirect the fluid coolant flow 85 to the coolant outlet 163, where it is further radially expelled outward to contact the set of main machine stator windings 90. This contacting further removes heat from the main machine stator windings 90 into the coolant.

Figure 9:
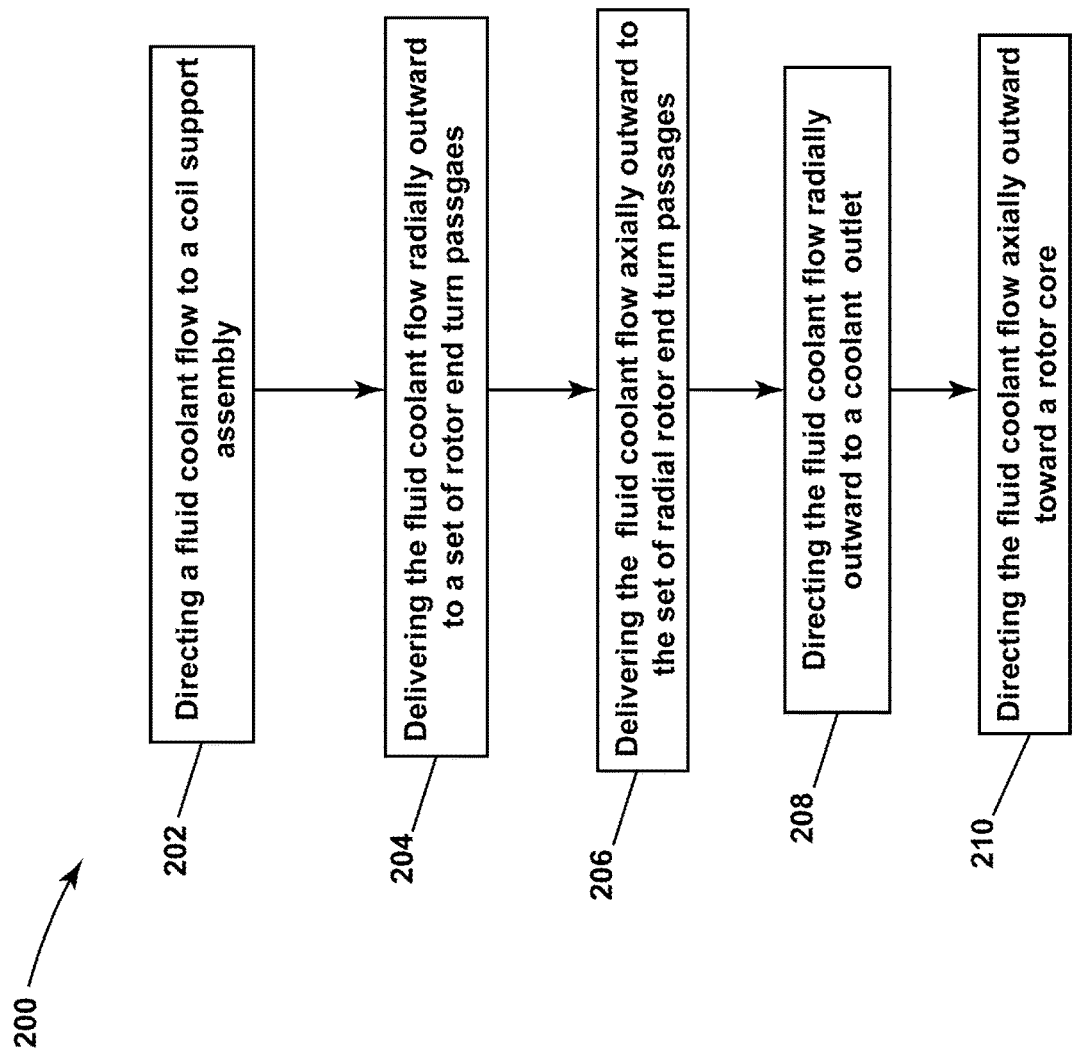
FIG. 9 illustrates an exemplary method flowchart diagram of cooling a rotor assembly, in accordance with various aspects described herein.

FIG. 9 illustrates a method 200 of cooling the set of rotor winding end turns 112 of the rotor assembly 96. At 202, the method 200 includes directing a fluid coolant flow 85 to the coil support assembly 140. A non-limiting example of directing the fluid coolant flow 85 by the coil support assembly 140 can include directing the fluid coolant flow 85 from the first coolant conduit 150 radially through the first coolant distribution ring 141 and into the first cavity 162. Another non-limiting example of directing the fluid coolant flow 85 to the coil support assembly 140 can include directing the fluid coolant flow 85 from the first coolant conduit 150 radially through the coil support disc 144. In other non-limiting aspects, the directing the fluid coolant flow 85 to the coil support assembly 140 can include directing the fluid coolant flow 85 from the first coolant conduit 150 radially through both the coil support disc 144 and the first coolant distribution ring 141.

The fluid coolant flow 85 can be delivered by the coil support assembly 140 through the set of radial rotor end turn passages 156 that extend radially through the set of rotor winding end turns 112. In non-limiting aspects, the method can include at 204, delivering the fluid coolant flow 85, by the first coolant distribution ring 141 of the coil support assembly 140, radially outward toward the set of radial rotor end turn passages 156. A non-limiting example of delivering the fluid coolant flow 85 by the coil support assembly 140 can include the delivering the fluid coolant flow 85 from the first coolant conduit 150 radially through the first coolant distribution ring 141 and into the first cavity 162 and through the rotor end turn passages 156.

In other non-limiting aspects, the method 200 can include at 206, delivering the fluid coolant flow 85, by the coil support disc 144 of the coil support assembly 140, axially outward toward the set of radial rotor end turn passages 156. A non-limiting example of delivering the fluid coolant flow 85 by the coil support assembly 140 through the set of radial rotor end turn passages 156 can include delivering the fluid coolant flow 85 flowing from the first coolant conduit 150 radially through the coil support disc 144 to a set of notches 185 defined thereon.

At 208, the method can include expelling or directing the fluid coolant flow 85 by a second coolant distribution ring 142 to the coolant outlet 168. The directing by the second coolant distribution ring 142 to the coolant outlet 168 allows the fluid coolant flow 85 to flow radially outward from the rotor assembly 96 toward a set of stator windings.

In non-limiting aspects, the method 200 can include at 210, expelling or directing, by the coil support disc 144, the fluid coolant flow 85 axially outward toward the rotor core 100.

The set of radial rotor end turn passages 156 are in a thermally conductive relationship with the set of rotor winding end turns 112 so heat from the set of rotor winding end turns 112 is transferred by conduction to the fluid coolant flow 85. Additionally, or alternatively, the notches 185 defined in the coil support disc 144 can be in a thermally conductive relationship with the set of rotor winding end turns 112 so heat from the set of rotor windings 110 is transferred by conduction to the fluid coolant flow 85 in the notches 185. The conduction of heat to the fluid coolant flow 85 and the thermally conductive relationships described herein can result in the fluid coolant flow 85 removing heat from the rotor assembly 96.

Many other possible aspects and configurations in addition to that shown in the above figures are contemplated by the present disclosure. For example, one aspect of the disclosure contemplates coolant conduits that extend along alternative portions or lengths of the set of rotor windings 110. In another example, the windings or the coolant conduits can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

The aspects disclosed herein provide method and apparatus for cooling a set of rotor windings or a set of rotor winding end turns during electric machine operations (e.g. motor or generator operations). One advantage that may be realized in the above aspects is that the above described aspects have significantly improved thermal conduction to remove heat from the set of rotor windings or the set of rotor winding end turns. The improved thermal conductivity between the set of rotor winding end turns and the coolant conduits coupled with the coolant channels provide for heat removal in a much more effective fashion from the rotor winding end turns to the coolant.

The increased thermal dissipation of the rotor winding end turns allows for a higher speed rotation, which may otherwise generate too much heat. The higher speed rotation may result in improved power generation or improved generator efficiency without increasing generator size. The described aspects having the fluid channels for the wet cavity machine are also capable of cooling the stator windings or end turn segments which further reduces thermal losses of the electric machine. Reduced thermal losses in the electric machine allows for greater efficiency and greater power density of the generator.

When designing aircraft components, reliability is also informant feature. The above described end assembly can provide additional physics stability and improved cooling to the rotor end windings. The stability and cooling provided by the coil support assembly allow an increase in performance and reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. Further aspects of the invention are provided by the subject matter of the following clauses:

A coil support assembly for an electromotive machine having a rotor core including a set of rotor windings and a rotatable shaft, comprising: a coil support disc rotatably coupled to the rotatable shaft, the coil support disc comprising a first face arranged to face the rotor core, and an opposing second face disposed to face away from the rotor core, the coil support disc further comprising a radially inner surface and an opposing radially outer surface disposed between the first face and second face, the radially inner surface defining a bore sized to receive the rotatable shaft therethrough, and arranged in fluid communication with the rotatable shaft to receive a flow of coolant therefrom, the radially outer surface defining a set of notches sized to receive a respective rotor winding axially therein, the coil support disc further including a set of channels defined therethrough, each channel comprising a respective inlet defined through the radially inner surface, and a respective outlet defined through the radially outer surface in fluid communication with a respective notch.

The coil support assembly of any preceding clause, wherein the coil support disc is disposed at least partially within a channel defined by a bight of an end turn of set of rotor windings.

The coil support assembly of any preceding clause, wherein at least a subset of the set of channels are in fluid communication with a respective axial slot defined in the rotor core.

The coil support assembly of any preceding clause, further comprising: a first coolant distribution ring having a first radially inner surface rotatably coupled to the rotatable shaft, and a first radially outer surface disposed to underlie an end turn of the set of rotor windings, relative to a rotational axis of the rotatable shaft, the first coolant distribution ring having set of first channels defined therethrough, extending radially between the first radially inner surface and the first radially outer surface, in fluid communication with the rotatable shaft and arranged to receive a flow of coolant therefrom; and a retaining ring disposed to at least partially overlie the first coolant distribution ring, the retaining ring fixedly coupled to the first coolant distribution ring.

The coil support assembly of any preceding clause, wherein the first radially inner surface defines a set of first grooves thereon in fluid communication with the rotatable shaft and the set of first channels.

The coil support assembly of any preceding clause, wherein at least one of the first coolant distribution ring and the retaining ring defines a set of tabs extending radially therefrom, the tabs disposed to be fixedly coupled to the other of the first coolant distribution ring and the retaining ring.

The coil support assembly of any preceding clause, further comprising: a second coolant distribution ring disposed radially between the end turn and the retaining ring, the second coolant distribution ring having a second radially inner surface defining a central bore and disposed to at least partially overlie the end turn relative to the rotational axis, and a second radially outer circumferential surface disposed to underlie the retaining ring, the second radially inner surface defining a set of axially extending first grooves arranged in fluid communication with the set of first channels to receive a flow of coolant therefrom, the second coolant distribution ring further defining a set of second channels therethrough, extending radially between the second radially inner surface and the second radially outer surface, and in fluid communication with the set of first grooves.

The coil support assembly of any preceding clause, wherein the second radially inner surface further defines a set of circumferentially extending third grooves in fluid communication with the set of first channels to receive a flow of coolant therefrom, wherein the set of second grooves and the set of third grooves are arranged in fluid communication with each other and at an angle with respect to each other.

The coil support assembly of any preceding clause, further comprising a coolant outlet defined by the coil support assembly and the rotor core in fluid communication with the set of second channels of the second coolant distribution ring.

A method of cooling a set of rotor winding end turns of a rotor assembly, comprising: directing a fluid coolant flow to a coil support assembly; delivering the fluid coolant flow, by a first coolant distribution ring of the coil support assembly, radially outward toward rotor winding end turns; and delivering the fluid coolant flow, by a coil support disc of the coil support assembly, axially outward toward the rotor winding end turns.

The method of any preceding clause, further comprising directing, by a second coolant distribution ring, the fluid coolant flow radially outward toward a set of stator windings.

The method of any preceding clause, further comprising directing, by the coil support disc, the fluid coolant flow axially outward toward a rotor core.

A rotor assembly for an electric machine comprising: a rotatable shaft having a rotational axis and defining a first coolant conduit fluidly connected with a source of coolant; a rotor core fixed relative to the rotatable shaft and defining at least one slot; a rotor winding disposed within the slot and defining a winding end turn extending axially beyond the rotor core; and a coil support assembly fixed relative to the rotatable shaft, the coil support assembly including a coil support disc comprising a first face arranged to face the rotor core, and an opposing second face disposed to face away from the rotor core, a radially inner surface and an opposing radially outer surface disposed between the first face and second face, the radially inner surface defining a bore sized to receive the rotatable shaft therethrough, and arranged in fluid communication with the rotatable shaft to receive a flow of coolant therefrom, the radially outer surface defining a set of notches sized to receive a respective rotor winding axially therein, the coil support disc further including a set of channels defined therethrough, each channel comprising a respective inlet defined through the radially inner surface, and a respective outlet defined through the radially outer surface in fluid communication with a respective notch.

The rotor assembly of any preceding clause, wherein the coil support disc is disposed at least partially within a channel defined by a bight of an end turn of set of rotor windings.

The rotor assembly of any preceding clause, wherein at least a subset of the set of channels are in fluid communication with a respective slot.

The rotor assembly of any preceding clause, further comprising: a first coolant distribution ring having a first radially inner surface rotatably coupled to the rotatable shaft, and a first radially outer surface disposed to underlie the end turn, relative to a rotational axis of the rotatable shaft, the first coolant distribution ring having set of first channels defined therethrough, extending radially between the first radially inner surface and the first radially outer surface, in fluid communication with the rotatable shaft and arranged to receive the flow of coolant therefrom; and a retaining ring disposed to at least partially overlie the first coolant distribution ring, the retaining ring fixedly coupled to the first coolant distribution ring.

The rotor assembly of any preceding clause, wherein the first radially inner surface defines a set of first grooves thereon in fluid communication with the rotatable shaft and the set of first channels.

The rotor assembly of any preceding clause wherein at least one of the first coolant distribution ring and the retaining ring defines a set of tabs extending radially therefrom, the tabs disposed to be fixedly coupled to the other of the first coolant distribution ring and the retaining ring.

The rotor assembly of any preceding clause, further comprising: a second coolant distribution ring disposed radially between the end turn and the retaining ring, the second coolant distribution ring having a second radially inner surface defining a central bore and disposed to at least partially overlie the end turn relative to a rotational axis of the rotatable shaft, and a second radially outer surface disposed to underlie the retaining ring, the second radially inner surface defining a set of axially extending second grooves arranged in fluid communication with the set of first channels to receive a flow of coolant therefrom, the second coolant distribution ring further defining a set of second channels therethrough, the second channels extending radially between the second radially inner surface and the second radially outer surface, and in fluid communication with the set of first grooves.

The rotor assembly of any preceding clause, wherein the second radially inner surface further defines a second set of third grooves in fluid communication with the set of first channels to receive the flow of coolant therefrom, wherein the set of second grooves and the set of third grooves are arranged in fluid communication with each other and at an angle with respect to each other.

What is claimed is:

1. A coil support assembly for an electromotive machine having a rotor core including a set of rotor windings and a rotatable shaft, comprising:
    a coil support disc rotatably coupled to the rotatable shaft, the coil support disc comprising a first face arranged to face the rotor core, and an opposing second face disposed to face away from the rotor core,
    the coil support disc further comprising a radially inner surface and an opposing radially outer surface disposed between the first face and second face, the radially inner surface defining a bore sized to receive the rotatable shaft therethrough, and arranged in fluid communication with the rotatable shaft to receive a flow of coolant therefrom, the radially outer surface defining a set of notches sized to receive a respective rotor winding axially therein,
    the coil support disc further including a set of channels defined therethrough, each channel comprising a respective inlet defined through the radially inner surface, and a respective outlet defined through the radially outer surface in fluid communication with a respective notch;
    a first coolant distribution ring having a first radially inner surface rotatably coupled to the rotatable shaft, and a first radially outer surface disposed to underlie an end turn of the set of rotor windings, relative to a rotational axis of the rotatable shaft, the first coolant distribution ring having set of first channels defined therethrough, extending radially between the first radially inner surface and the first radially outer surface, in fluid communication with the rotatable shaft and arranged to receive a flow of coolant therefrom; and
    a retaining ring disposed to at least partially overlie the first coolant distribution ring, the retaining ring fixedly coupled to the first coolant distribution ring.

2. The coil support assembly of claim 1, wherein the coil support disc is disposed at least partially within a channel defined by a bight of an end turn of set of rotor windings.

3. The coil support assembly of claim 1, wherein at least a subset of the set of channels are in fluid communication with a respective axial slot defined in the rotor core.

4. The coil support assembly of claim 1, wherein the first radially inner surface defines a set of first grooves thereon in fluid communication with the rotatable shaft and the set of first channels.

5. The coil support assembly of claim 1, wherein at least one of the first coolant distribution ring and the retaining ring defines a set of tabs extending radially therefrom, the tabs disposed to be fixedly coupled to the other of the first coolant distribution ring and the retaining ring.

6. The coil support assembly of claim 1, further comprising:
    a second coolant distribution ring disposed radially between the end turn and the retaining ring, the second coolant distribution ring having a second radially inner surface defining a central bore and disposed to at least partially overlie the end turn relative to the rotational axis, and a second radially outer circumferential surface disposed to underlie the retaining ring, the second radially inner surface defining a set of axially extending first grooves arranged in fluid communication with the set of first channels to receive a flow of coolant therefrom, the second coolant distribution ring further defining a set of second channels therethrough, extending radially between the second radially inner surface and the second radially outer surface, and in fluid communication with the set of first grooves.

7. The coil support assembly of claim 6, wherein the second radially inner surface further defines a set of circumferentially extending third grooves in fluid communication with the set of first channels to receive a flow of coolant therefrom, wherein the set of second grooves and the set of third grooves are arranged in fluid communication with each other and at an angle with respect to each other.

8. The coil support assembly of claim 6, further comprising a coolant outlet defined by the coil support assembly and the rotor core in fluid communication with the set of second channels of the second coolant distribution ring.

9. A method of cooling a set of rotor winding end turns of a rotor assembly, comprising:
    directing a fluid coolant flow to a coil support assembly;
    delivering the fluid coolant flow, by a first coolant distribution ring of the coil support assembly, radially outward toward rotor winding end turns; and
    delivering the fluid coolant flow, by a coil support disc of the coil support assembly, axially outward toward the rotor winding end turns.

10. The method of claim 9, further comprising directing, by a second coolant distribution ring, the fluid coolant flow radially outward toward a set of stator windings.

11. The method of claim 9, further comprising directing, by the coil support disc, the fluid coolant flow axially outward toward a rotor core.

12. A rotor assembly for an electric machine comprising:
    a rotatable shaft having a rotational axis and defining a first coolant conduit fluidly connected with a source of coolant;
    a rotor core fixed relative to the rotatable shaft and defining at least one slot;
    a rotor winding disposed within the slot and defining a winding end turn extending axially beyond the rotor core; and
    a coil support assembly fixed relative to the rotatable shaft, the coil support assembly including a coil support disc,
    comprising a first face arranged to face the rotor core, and an opposing second face disposed to face away from the rotor core,
    a radially inner surface and an opposing radially outer surface disposed between the first face and second face, the radially inner surface defining a bore sized to receive the rotatable shaft therethrough, and arranged in fluid communication with the rotatable shaft to receive a flow of coolant therefrom, the radially outer surface defining a set of notches sized to receive a respective rotor winding axially therein, the coil support disc further including a set of channels defined therethrough, each channel comprising a respective inlet defined through the radially inner surface, and a respective outlet defined through the radially outer surface in fluid communication with a respective notch;

a first coolant distribution ring having a first radially inner surface rotatably coupled to the rotatable shaft, and a first radially outer surface disposed to underlie the end turn, relative to a rotational axis of the rotatable shaft, the first coolant distribution ring having set of first channels defined therethrough, extending radially between the first radially inner surface and the first radially outer surface, in fluid communication with the rotatable shaft and arranged to receive the flow of coolant therefrom; and a retaining ring disposed to at least partially overlie the first coolant distribution ring, the retaining ring fixedly coupled to the first coolant distribution ring.

13. The rotor assembly of claim 12, wherein the coil support disc is disposed at least partially within a channel defined by a bight of an end turn of set of rotor windings.

14. The rotor assembly of claim 12, wherein at least a subset of the set of channels are in fluid communication with a respective slot.

15. The rotor assembly of claim 12, wherein the first radially inner surface defines a set of first grooves thereon in fluid communication with the rotatable shaft and the set of first channels.

16. The rotor assembly of claim 15, further comprising:
a second coolant distribution ring disposed radially between the end turn and the retaining ring, the second coolant distribution ring having a second radially inner surface defining a central bore and disposed to at least partially overlie the end turn relative to a rotational axis of the rotatable shaft, and a second radially outer surface disposed to underlie the retaining ring, the second radially inner surface defining a set of axially extending second grooves arranged in fluid communication with the set of first channels to receive a flow of coolant therefrom, the second coolant distribution ring further defining a set of second channels therethrough, the second channels extending radially between the second radially inner surface and the second radially outer surface, and in fluid communication with the set of first grooves.

17. The rotor assembly of claim 16, wherein the second radially inner surface further defines a second set of third grooves in fluid communication with the set of first channels to receive the flow of coolant therefrom, wherein the set of second grooves and the set of third grooves are arranged in fluid communication with each other and at an angle with respect to each other.

18. The rotor assembly of claim 12, wherein at least one of the first coolant distribution ring and the retaining ring defines a set of tabs extending radially therefrom, the tabs disposed to be fixedly coupled to the other of the first coolant distribution ring and the retaining ring.

* * * * *